US005702824A

United States Patent [19]

Matsunaga et al.

[11] Patent Number: 5,702,824

[45] Date of Patent: Dec. 30, 1997

[54] DIELECTRICS FOR TRANSFER SHEET CARRYING MEMBER

[75] Inventors: Satoru Matsunaga, Ishioka; Masayuki Hino, Niihari-gun; Yosikiti Teramoto, Inashiki-gun, all of Japan

[73] Assignee: Kureha Kagaku Kogyo Kabushiki Kaisha, Tokyo, Japan

[21] Appl. No.: 440,310

[22] Filed: Apr. 5, 1995

[30] Foreign Application Priority Data

Apr. 7, 1994 [JP] Japan .................................... 6-093676

[51] Int. Cl.$^{6}$ ...................................................... B32B 27/00

[52] U.S. Cl. ....................... 428/500; 428/195; 428/411.1; 428/421; 428/515; 428/522; 525/199; 525/227

[58] Field of Search .................................... 428/199, 215, 428/421, 195, 411.1, 515, 522; 526/255; 525/72, 199, 227

[56] References Cited

U.S. PATENT DOCUMENTS

| | | | |
|---|---|---|---|
| 4,575,533 | 3/1986 | Horie et al. | 525/72 |
| 5,034,460 | 7/1991 | Nishioka | 525/72 |
| 5,077,362 | 12/1991 | Watanabe et al. | 526/255 |
| 5,114,520 | 5/1992 | Wang, Jr. et al. . | |
| 5,132,164 | 7/1992 | Moriya et al. | 428/199 |
| 5,250,994 | 10/1993 | Ito et al. | 355/271 |

FOREIGN PATENT DOCUMENTS

| | | |
|---|---|---|
| 5-200904 | 8/1993 | Japan . |
| 2 272 58 | 5/1994 | United Kingdom . |

OTHER PUBLICATIONS

Patent Abstracts of Japan, vol. 017, No. 441 (1993).

Engl.abstract of Tanaka et al.App.No. 5-200 904-A, pub.Aug'93.

*Primary Examiner*—William Krynski
*Attorney, Agent, or Firm*—David G. Conlin; Peter F. Corless

[57] ABSTRACT

The disclosure describes dielectrics for a transfer sheet carrying member used in electrophotographic image forming apparatus, comprising 80 to 96 mass % of a vinylidene fluoride-based resin and 4 to 20 mass % of a methyl methacrylate-based resin.

8 Claims, No Drawings

DIELECTRICS FOR TRANSFER SHEET CARRYING MEMBER

BACKGROUND OF THE INVENTION

The present invention relates to dielectrics for a transfer sheet carrying member, and particularly relates to dielectrics for a transfer sheet carrying member used in an image forming apparatus in which the developed image obtained by developing the surface of an image carrier with a developer according to an electrophotographic or electrostatic recording system is transferred to a transfer sheet on the transfer sheet carrying member, and the transfer sheet carrying member comprising the dielectrics. More particularly, the present invention relates to dielectrics for a transfer sheet carrying member suited for use in color copying machines, color laser beam printers, facsimiles, etc., in which the developed images corresponding to the respective color components formed on the surface of an image carrier are multi-transferred to a transfer sheet on the transfer sheet carrying member to obtain a multicolor image, and the transfer sheet carrying member comprising the dielectrics.

In an electrophotographic image forming apparatus, the toner image formed on the surface of a photoconductor drum or belt-like shape is transferred to a transfer sheet on a transfer sheet carrying member with the aid of the charging operation by a transfer charger. Especially in the case of color image, since three- or four-color multiple transfer is performed, a step-up operation for changing the transfer conditions with increase of transfer frequency is required, and a successively higher voltage is applied in accordance with such step-up operation. It is therefore desirable that the dielectric layer of the transfer sheet carrying member is one which has a high dielectric constant, as such dielectric layer is capable of holding a large number of charges with a low voltage. In this respect, vinylidene fluoride-based resins are suitable as a dielectric material.

However, the volume resistivity of the vinylidene fluoride-based resins vary remarkably when placed under the different environments. For example, the volume resistivity of the vinylidene fluoride-based resins when placed under an environment of about 90% RH and about 30° C., decreases by about 15% (decreasing percentage: about 85%) as compared with that when placed under a normal environment of about 65% RH and about 23° C. Such acute variation of volume resistivity gives rise to the problem of image distortion.

In the course of the present inventors' studies for solving the above problem, it has been found that by mixing a specified amount of a methyl methacrylate-based resin with a vinylidene fluoride-based resin, the obtained dielectrics are little in variation of volume resistivity with change of ambient humidity and temperature, has a high dielectric constant and is useful as material for transfer sheet carrying member used in electrophotographic image forming apparatus. The present invention has been attained on the basis of this finding.

SUMMARY OF THE INVENTION

It is an object of the present invention to provide dielectrics for a transfer sheet carrying member used in an electrophotographic image forming apparatus, the dielectrics being little in variation of volume resistivity with change of ambient humidity and temperature, and having a high dielectric constant.

To accomplish the aim, in a first aspect of the present invention, there are provided dielectrics for a transfer sheet carrying member used in an electrophotographic image forming apparatus, comprising 80 to 96 mass % of a vinylidene fluoride-based resin and 4 to 20 mass % of a methyl methacrylate-based resin.

In a second aspect of the present invention, there is provided a transfer sheet carrying member used in an electrophotographic image forming apparatus, comprising dielectrics comprising 80 to 96 mass % of a vinylidene fluoride-based resin and 4 to 20 mass % of a methyl methacrylate-based resin.

In a third aspect of the present invention, there is provided a transfer sheet carrying member used in an electrophotographic image forming apparatus, comprising dielectrics comprising 80 to 96 mass % of a vinylidene fluoride-based resin and 4 to 20 mass % of a methyl methacrylate-based resin, and an elastic layer disposed on the inside thereof.

DETAILED DESCRIPTION OF THE INVENTION

The dielectrics for the transfer sheet carrying member according to the present invention is composed of a composition comprising 80 to 96 mass %, preferably 85 to 95 mass % of a vinylidene fluoride-based resin and 4 to 20 mass %, preferably 5 to 15 mass % of a methyl methacrylate-based resin.

The vinylidene fluoride-based resin usable in the present invention includes a vinylidene fluoride homopolymer, copolymers having vinylidene fluoride as main structural unit and a mixture thereof. Preferred examples of the said copolymers are copolymers of vinylidene fluoride with at least one co-monomer such as ethylene tetrafluoride, ethylene trifluoride, ethylene trifluorochloride, vinyl fluoride, propylene hexafluoride and the like, especially those in which the content of vinylidene fluoride is not less than 70 mol %.

Also, the vinylidene fluoride-based resin usable in the present invention is one having an inherent viscosity of usually 0.8 to 1.4 dl/g, preferably 1.0 to 1.3 dl/g, as measured in a concentration of 0.4 g/dl at 30° C. with dimethylformaldehyde as solvent.

The content of the vinylidene fluoride-based resin in the dielectrics of the present invention is 80 to 96 mass %, preferably 85 to 95 mass %. When the content of vinylidene fluoride-based resin is lower than 80 mass %, reduction of dielectric constant of the transfer sheet carrying member is remarkable, and when the said content exceeds 96 mass %, the humidity and temperature dependency of volume resistivity elevates.

The methyl methacrylate-based resins usable in the present invention includes a methyl methacrylate homopolymer, copolymers having methyl methacrylate as main structural unit and a mixture thereof. Preferred examples of the said copolymers are copolymers of not less than 50 mol % of methyl methacrylate and less than 50 mol % of acrylic esters or methacrylic esters other than methyl methacrylate, especially those in which the content of methyl methacrylate is not less than 70 mol %. Preferred examples of co-monomers which are acrylic esters or methacrylic esters other than methyl methacrylate usable in the present invention, include methyl acrylate, ethyl acrylate, propyl acrylate, butyl acrylate, ethyl methacrylate, propyl methacrylate and the like.

The methyl methacrylate-based resin used in the present invention is one having a melt viscosity of usually 90 to 6,000 Pa.s, preferably 500 to 4,000 Pa.s. The "melt viscosity" referred to in the present invention is the value determined by using Capiro Graph (manufactured by Toyo Fine Machinary Co., Ltd.) at a temperature of 250° C. at a shear rate of 50 $sec^{-1}$.

The content of the methyl methacrylate-based resin in the dielectric of the present invention is 4 to 20 mass %, preferably 5 to 15 mass %. When the content of methyl methacrylate-based resin exceeds 20 mass %, the dielectric constant of the dielectrics of the present invention lowers, which weakens the charge retentivity of the transfer sheet carrying member and may cause positional shift of the transfer sheet. When the said content is lower than 4 mass %, the humidity and temperature dependency of volume resistivity elevates.

The dielectrics of the present invention not only substantially consists of a vinylidene fluoride resin and a methyl methacrylate-based resin, it may also contain other material as far as the purport of the present invention is not impaired. The shape of the dielectrics of the present invention may be sheet-like or tubular. Also, the dielectrics of the present invention may be stretched or non-stretched, and the thickness is not specifically defined as it depends on the structure and size of the image forming apparatus, but the thickness is usually in the range of about 5 to 200 μm, preferably 50 to 150 μm.

The transfer sheet carrying member used in an electrophotographic image forming apparatus according to the present invention may be composed of dielectrics alone or may have a multilayered structure having dielectrics. A typical example of the multilayered structure is a transfer sheet carrying member comprising an elastic layer disposed on the inside of dielectrics (dielectric layer), such as disclosed in Japanese Patent Application KOKAI (Laid-Open) No. 5-204263.

The elastic layer used in the multilayered structure may, for instance, be a layer composed of a foamed elastomer such as soft urethane foam, silicone sponge or the like, which has a density of 20 to 150 $kg/m^3$ and a compressibility at the transfer position of 0 to 2 mm, with the linear pressure within this compressibility of not more than 1 kg/mm. The thickness of this elastic layer is 2 to 10 mm.

The transfer sheet carrying member according to the present invention can be used in the image forming apparatus such as electrophotographic copying machines, laser printers, facsimiles, etc. The object to be copied or printed may be either analog or digital.

The environment dependency of volume resistivity (decreasing percentage of volume resistivity at 23° C. and 65% RH as compared with that at 30° C. and 90% RH) of the dielectrics of the present invention is about not more than 65%, and the environment dependency of relative dielectric constant (changing percentage of relative dielectric constant at 23° C. and 65% RH as compared with that at 30° C. and 90% RH) is hardly recognized. These values attest to very small environment dependency of the properties of the transfer sheet carrying member of the present invention.

Thus, the dielectrics for transfer sheet carrying member used in image forming apparatus according to the present invention suffers little change of volume resistivity on change of ambient humidity and temperature and has a high dielectric constant.

EXAMPLES

A vinylidene fluoride homopolymer, KF#1100 (produced by Kureha Chemical Industries Co., Ltd.; pelletized) having an inherent viscosity of 1.1 dl/g was used as vinylidene fluoride-based resin, and Parapete HR (produced by Kuraray Co., Ltd.) having a melt viscosity of 2,700 Pa.s was used as methyl methacrylate-based resin. The methyl methacrylate-based resin was dried at 70° C. for 12 hours before blending. The above resins were blended and extruded at a T-die temperature of 260° C. to form a 75 μm-thick sheet. Volume resistivity and relative dielectric constant of the obtained sheet, both determined according to JIS C2318 under the measuring voltage of 1 kV, are shown in Table 1 and Table 2, respectively. The mixing ratio of both resins was as shown in Tables 1 and 2, with vinylidene fluoride homopolymer alone used as reference.

TABLE 1

Environment dependency of volume resistivity

| | Volume resistivity of sheet ($\times 10^{12}$ Ω · m) | | | | | |
|---|---|---|---|---|---|---|
| Mass % of methyl methacrylate-based resin in sheet | 0% | 5% | 9% | 17% | 23% | 29% |
| Environment: 23° C., 65% RH | 0.59 | 7.1 | 15 | 27 | 35 | 44 |
| Environment: 30° C., 90% RH | 0.093 | 2.7 | 9.4 | 20 | 28 | 35 |

TABLE 2

Environment dependency of relative dielectric constant

| | Relative dielectric constant of sheet | | | | | |
|---|---|---|---|---|---|---|
| Mass % of methyl methacrylate-based resin in sheet | 0% | 5% | 9% | 17% | 23% | 29% |
| Environment: 23° C., 65% RH | 10.9 | 9.9 | 8.0 | 6.4 | 5.9 | 5.6 |
| Environment: 30° C., 90% RH | 10.8 | 9.6 | 8.0 | 6.9 | 6.3 | 6.0 |

What is claimed is:

1. A transfer sheet carrying member of an electrophotographic image forming apparatus, comprising 80 to 96 mass % of a vinylidene fluoride based resin having an inherent viscosity of 0.8 to 1.4 dl/g as measured in a concentration of 0.4 g/dl at 30° C. with dimethylformaldehyde as solvent and 4 to 20 mass % of a methyl methacrylate-based resin having a melt viscosity of 90 to 6,000 Pa's as measured at 250° C. at a shear rate of 50 $sec^{-1}$.

2. A transfer sheet carrying member according to claim 1 wherein the content of the vinylidene fluoride-based resin is 85 to 95 mass % and the content of the methyl methacrylate-based resin is 5 to 15 mass %.

3. A transfer sheet carrying member according to claim 1 wherein the vinylidene fluoride resin is a vinylidene fluoride homopolymer, a copolymer of not less than 70 mol % of vinylidene fluoride and at least one comonomer selected from the group consisting of ethylene tetrafluoride, ethylene trifluoride, ethylene trifluorochloride, vinyl fluoride and propylene hexafluoride, or a mixture of said polymers.

4. A transfer sheet carrying member according to claim 1 wherein the transfer sheet carrying member has a thickness of 5 to 200 μm.

5. A transfer sheet carrying member according to method according to claim 1 wherein an elastic layer is disposed on the transfer sheet carrying member, the elastic layer having a density of 20 to 150 $kg/m^3$ and a compressibility at the transfer position of 0 to 2 mm, with the linear pressure within this compressibility of not more than 1 kg/mm.

6. An electrophotographic image forming apparatus comprising a transfer sheet carrying member that comprises a transfer sheet comprising 80 to 96 mass % of a vinylidene fluoride-based resin having an inherent viscosity of 0.8 to 1.4 dl/g as measured in a concentration of 0.4 g/dl at 30° C. with dimethylformaldehyde as solvent and 4 to 20 mass % of a methyl methacrylate-based resin having a melt viscosity of 90 to 6,000 pa.s as measured at 250° C. at a shear rate of 50 $sec^{-1}$.

7. An electrophotographic image forming apparatus according to claim 6 wherein the vinylidene fluoride-based resin in the transfer sheet carrying member is 85 to 95 mass % and the content of the methyl methacrylate-based resin is 5 to 15%.

8. An electrophotographic image forming apparatus according to claim 6 wherein an elastic layer is disposed on the transfer sheet carrying member, the elastic layer having a density of 20 to 150 $kg/m^3$ and a compressibility at the transfer position of 0 to 2 mm, with the linear pressure within this compressibility of not more than 1 kg/mm.

* * * * *